United States Patent
Surana et al.

(10) Patent No.: US 12,267,685 B2
(45) Date of Patent: Apr. 1, 2025

(54) LAWFUL INTERCEPTION TRIGGERED TASK STATUS

(71) Applicant: Microsoft Technology Licensing, LLC, Redmond, WA (US)

(72) Inventors: Neeraj Surana, Karnataka (IN); Kantha Rao Dammalapati, Karnataka (IN); Michael Anthony Brown, McKinney, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 442 days.

(21) Appl. No.: 17/804,252

(22) Filed: May 26, 2022

(65) Prior Publication Data

US 2023/0164573 A1    May 25, 2023

(30) Foreign Application Priority Data

Nov. 22, 2021  (IN) .............................. 202141053655

(51) Int. Cl.
*H04W 28/04*    (2009.01)
*H04L 67/141*   (2022.01)
*H04W 12/80*    (2021.01)

(52) U.S. Cl.
CPC ........... *H04W 12/80* (2021.01); *H04L 67/141* (2013.01); *H04W 28/04* (2013.01)

(58) Field of Classification Search
CPC .............................. H04W 12/80; H04W 28/04
See application file for complete search history.

(56) References Cited

U.S. PATENT DOCUMENTS

| 2022/0417756 | A1* | 12/2022 | Saghir ..................... H04L 63/30 |
| 2023/0422042 | A1* | 12/2023 | Vitiello ................. H04L 63/306 |
| 2024/0015187 | A1* | 1/2024 | Cione ................... H04L 63/306 |

FOREIGN PATENT DOCUMENTS

| WO | 2020060452 A1 | 3/2020 |
| WO | 2020143917 A1 | 7/2020 |

(Continued)

OTHER PUBLICATIONS

"3rd Generation Partnership Project; Technical Specification Group Services And System Aspects; Security; Protocol And Procedures For Lawful Interception (Li); Stage 3 (Release 17)", Retrieved From: https://ftp.3gpp.org/Specs/archive/33_series/33.128/33128 -h20.zip 33128 -h20.docx, Sep. 23, 2021, 275 Pages.

(Continued)

*Primary Examiner* — Michael T Vu
(74) *Attorney, Agent, or Firm* — ARENTFOX SCHIFF LLP

(57) ABSTRACT

Lawful interception (LI) of electronic communications includes receiving, by a triggering function (TF), a task request including a task identifier (ID) from a LI provisioning function (LIFP). The TF receives an indication of a protocol data unit (PDU) session establishment applicable to the received request, and then triggers (including a POI task ID) each point of interception (POI) applicable to the request. The TF receives a task response indicating a status of the task at the triggered POI. The TF reports, to the LIPF, a TF task issue request indicating the status, the TF task ID, the POI task ID, and a network entity ID of the POI.

9 Claims, 7 Drawing Sheets

(56) References Cited

FOREIGN PATENT DOCUMENTS

| WO | 2021126020 A1 | 6/2021 |
|---|---|---|
| WO | 2021251853 A1 | 12/2021 |

OTHER PUBLICATIONS

"Lawful Interception (Li); Internal Network Interfaces; Part 1: XI", Retrieved From: http://www.etsi.org/deliver/etsi_ts/103200_103299/10322101/01.09.01_60/ts_10322101v010901p.pdf, Jul. 26, 2021, 44 Pages.

"International Search Report and Written Opinion Issued in PCT Application No. PCT/US2022/042818", Mailing Date: Dec. 16, 2022, 9 Pages.

"Invitation To Pay Additional Fees Issued in PCT Application No. PCT/US2022/042818", Mailing Date: Oct. 25, 2022, 8 Pages.

"ETSI TS 103 221-1 V1.10.1", Retrieved from: https://www.etsi.org/deliver/etsi_ts/103200_103299/10322101/01.10.01_60/ts_10322101v011001p.pdf, Dec. 2021, 51 Pages.

"ETSI TS 103 221-1 V1.9.1", Retrieved from: https://www.etsi.org/deliver/etsi_ts/103200_103299/10322101/01.09.01_60/ts_10322101v010901p.pdf, Jul. 2021, 44 Pages.

"ETSI TS 103 221-2 V1.5.2", Retrieved from: https://www.etsi.org/deliver/etsi_ts/103200_103299/10322102/01.05.02_60/ts_10322102v010502p.pdf, Oct. 2021, 30 Pages.

"ETSI TS 133 127 V16.10.0", Retrieved from: https://www.etsi.org/deliver/etsi_ts/133100_133199/133127/16.10.00_60/ts_133127v161000p.pdf, Jan. 2022, 109 Pages.

"ETSI TS 133 127 V16.9.0", Retrieved from: https://www.etsi.org/deliver/etsi_ts/133100_133199/133127/16.09.00_60/ts_133127v160900p.pdf, Sep. 2021, 109 Pages.

"ETSI TS 133 128 V16.8.0", Retrieved from: https://www.etsi.org/deliver/etsi_ts/133100_133199/133128/16.08.00_60/ts_133128v160800p.pdf, Sep. 2021, 179 Pages.

"ETSI TS 133 128 V16.9.0", Retrieved from: https://www.etsi.org/deliver/etsi_ts/133100_133199/133128/16.09.00_60/ts_133128v160900p.pdf, Jan. 2022, 176 Pages.

\* cited by examiner

300

```
┌─────────────────────────────────────────────────────────────────────┐
│ Receive, by a triggering function (TF), a task request from a LI    │
│ provisioning function (LIFP), the task request comprising a TF task │
│ identifier (ID).                                                     │
│                              310                                     │
└─────────────────────────────────────────────────────────────────────┘
                                  │
                                  ▼
┌─────────────────────────────────────────────────────────────────────┐
│ Receive, by the TF, an indication of a protocol data unit (PDU)      │
│ session establishment applicable to the received task request.       │
│                              320                                     │
└─────────────────────────────────────────────────────────────────────┘
                                  │
                                  ▼
┌─────────────────────────────────────────────────────────────────────┐
│ Trigger, by the TF, each point of interception (POI) of one or more  │
│ POIs applicable to the received task request in response to          │
│ receiving the indication of PDU session establishment, the           │
│ triggering including a POI task ID.                                  │
│                              330                                     │
└─────────────────────────────────────────────────────────────────────┘
                                  │
                                  ▼
┌─────────────────────────────────────────────────────────────────────┐
│ Receive, by the TF from a triggered POI, a task response indicating  │
│ a status of the received task at the triggered POI.                  │
│                              340                                     │
└─────────────────────────────────────────────────────────────────────┘
                                  │
                                  ▼
┌─────────────────────────────────────────────────────────────────────┐
│ Report, by the TF to the LIPF, a TF task issue request indicating    │
│ i) the status, ii) the TF task ID, iii) the POI task ID, and iv) a   │
│ network entity ID of the triggered POI.                              │
└─────────────────────────────────────────────────────────────────────┘
```

Request, by an LI provisioning function (LIPF) from a triggering function (TF) details of one or more LIPF tasks previously requested of the TF by the LIPF.
510

↓

First receive, by the LIPF from the TF, a response to the first request, the response to the first request identifying, for each LIPF task present in the TF, TF task details of each corresponding TF task triggering a point of interception (POI), the TF task details comprising an identifier of each triggered POI and a corresponding TF task identifier..
520

↓

Request, by the LIPF from each identified POI, details of the task corresponding to the TF task identifier.
530

↓

Receive, by the LIPF, a status of the TF task corresponding to the TF task identifier.
540

↓

Identify as in error, each LIPF task for which the TF task details of the response to the first request do not match the TF task details of the response to the second request.
550

FIG. 5

LAWFUL INTERCEPTION TRIGGERED TASK STATUS

CROSS REFERENCE TO RELATED APPLICATIONS

This application claims priority to Indian Pat. App. No. 202141053655, entitled "LAWFUL INTERCEPTION TRIGGERED TASK STATUS" filed Nov. 22, 2021.

BACKGROUND

Lawful interception (LI) refers to functions of electronic communication networks that allow law enforcement agencies (LEAs) to monitor certain communications over the network. Most jurisdictions require telecommunications operators, such as communication service providers (CSPs) in 5G public land mobile networks (PLMNs), to provide LI interfaces and functionality. Widely-adopted standards for PLMN LI are promulgated by the European Telecommunications Standards Institute (ETSI) and the Third Generation Partnership Project (3GPP).

Referring to FIG. 1, a high level architecture 100 for LI in a CSP's system is shown. Such an architecture 100 can be divided into an LEA domain 194 and a CSP domain 192. Typically, the LEA 170 is responsible for submitting the warrant 102 to the CSP and for maintaining a law enforcement monitoring function (LEMF 160). The CSP maintains an administrative function (ADMF 120) that administers provisioning/activating, modifying, and de-activating/de-provisioning the point(s) of interception (POI 142, 144), triggering functions (TF 130), and a mediation and delivery functions (MDF 150). The ADMF 120 includes several logical sub-functions, including an LI control function (LICF 124) and at least one LI provisioning function (LIPF 122). The LICF 124 controls the management of the end-to-end life cycle of a warrant.

POIs (142, 144) detect target communication, derive the intercept related information (IRI), e.g., phone numbers, or communications content (CC), e.g., voice, from the target communications, and deliver the POI output 186 as xIRI to one type of MDF 150 or as xCC to another type of MDF 150. The type of POI output 186 is determined by the type of the network function (NF)/network entity (NE) associated with the POI 142, 144. Multiple POIs may be involved in executing a warrant 102.

The LIPF 122 provisions NEs, such as POIs (142, 144), TFs 130, and MDFs 150 using intercept provisioning interface 184—though the direct management interface 184b between an LIPF and a triggered POI 142 is used only for functions such as audit. The LIPF 122 is the secure proxy used by the LICF 124 to communicate with POIs (142, 144), TFs 130, MDFs 150, and other infrastructure required to operate LI within the CSP network. In some instances, LIPF 122 is responsible for receiving triggering information and forwarding the trigger to the appropriate NE.

The TF 130 is provisioned by the LIPF 122 and is responsible for triggering and indirectly provisioning triggered POIs 142 (as opposed to directly-provisioned POI 144) over triggering interface 185 in response to network and service events matching the criteria provisioned by the LIPF 122. The TF 130 detects the events and sends a trigger to each associated triggered POI 142. As a part of triggering, the TF 130 sends interception rules (e.g., rules that allow the POI 142 to detect the target communications, forwarding rules (e.g., which MDF2, MDF3 to address), target identity, and the correlation information. A TF 130 that triggers communications content POI (CC-POI) is referred to as a CC-TF and a TF 130 that triggers an intercept-related information POI (IRI-POI) is referred to as IRI-TF.

The MDF 150 delivers the interception product 189 to the Law Enforcement Monitoring Facility (LEMF). Two variations of MDF are defined: MDF2 and MDF3. MDF2 generates the IRI messages from the xIRI and sends them to one or more LEMF s 160. An MDF3 generates the CC from the xCC and delivers it to one or more intercepting LEMFs 160. A system information retrieval function (SIRF 110) provides the LIPF 122 with system-related information 182 for network entities (NEs)/network functions (NFs), such as the session management function (SMF) in a 5G core network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, devices, and computer-readable media for lawful interception (LI) of electronic communications include receiving, by a triggering function (TF), a task request from a LI provisioning function (LIFP). The task request includes a TF task identifier (ID), e.g., an LIPF-provisioned task ID. The TF receives an indication of a protocol data unit (PDU) session establishment (or some other event) applicable to the received task request. The TF triggers each point of interception (POI) of one or more POIs applicable to the received task request in response to receiving the indication. The triggering including a POI task ID generated by the TF. The TF receives, from a triggered POI, a task response indicating a status of the received task at the triggered POI. The TF then reports, to the LIPF, a TF task issue request indicating i) the status, ii) the TF task ID, iii) the POI task ID, and iv) a network entity ID of the triggered POI.

Methods, devices, and computer-readable mediums for lawful interception (LI) of electronic communications include first requesting, by an LIPF from a triggering function (TF), details of each LIPF task present in the TF. The LIPF then first receives, from the TF, a response to the first request. The response to the first request identifies, for each LIPF task present in the TF, TF task details of each corresponding TF task triggering a point of interception (POI). The TF task details include an identifier of each triggered POI and a corresponding TF task identifier. The LIPF then second requests, from each identified POI, details of each TF task present on the POI. The LILPF then receives, from a second requested POI, a response to the second request. The response to the second request identifies TF task details of each TF task present the second requested POI. This allows the LIPF to reconcile task status at each POI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3 is a flowchart of methods of LI, in accordance with examples of the technology disclosed herein.

FIG. 5 is a flowchart of methods of LI, in accordance with examples of the technology disclosed herein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Figure 1:
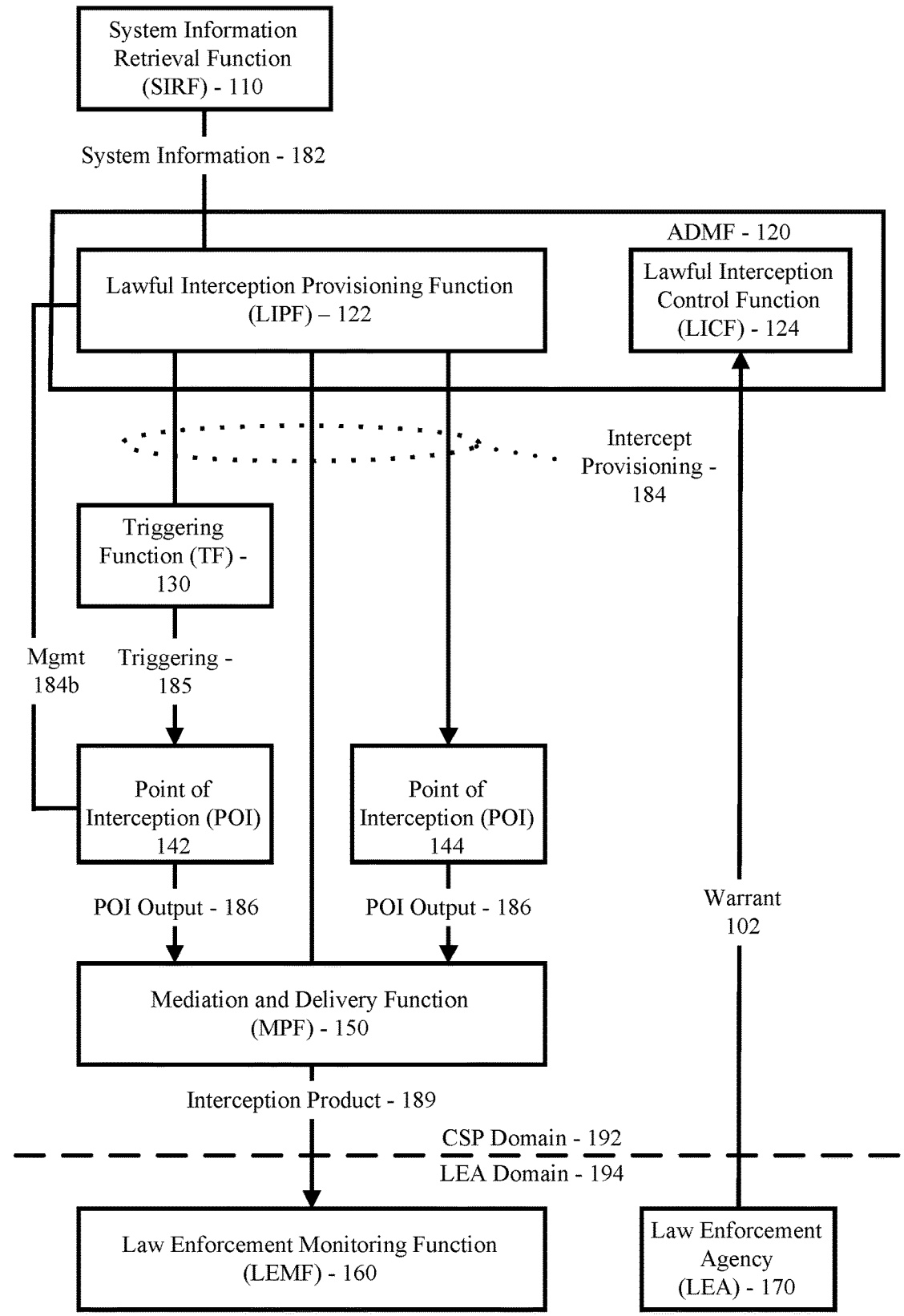
FIG. 1 is a high level architecture 100 for LI in a CSP's system.
Figure 2:
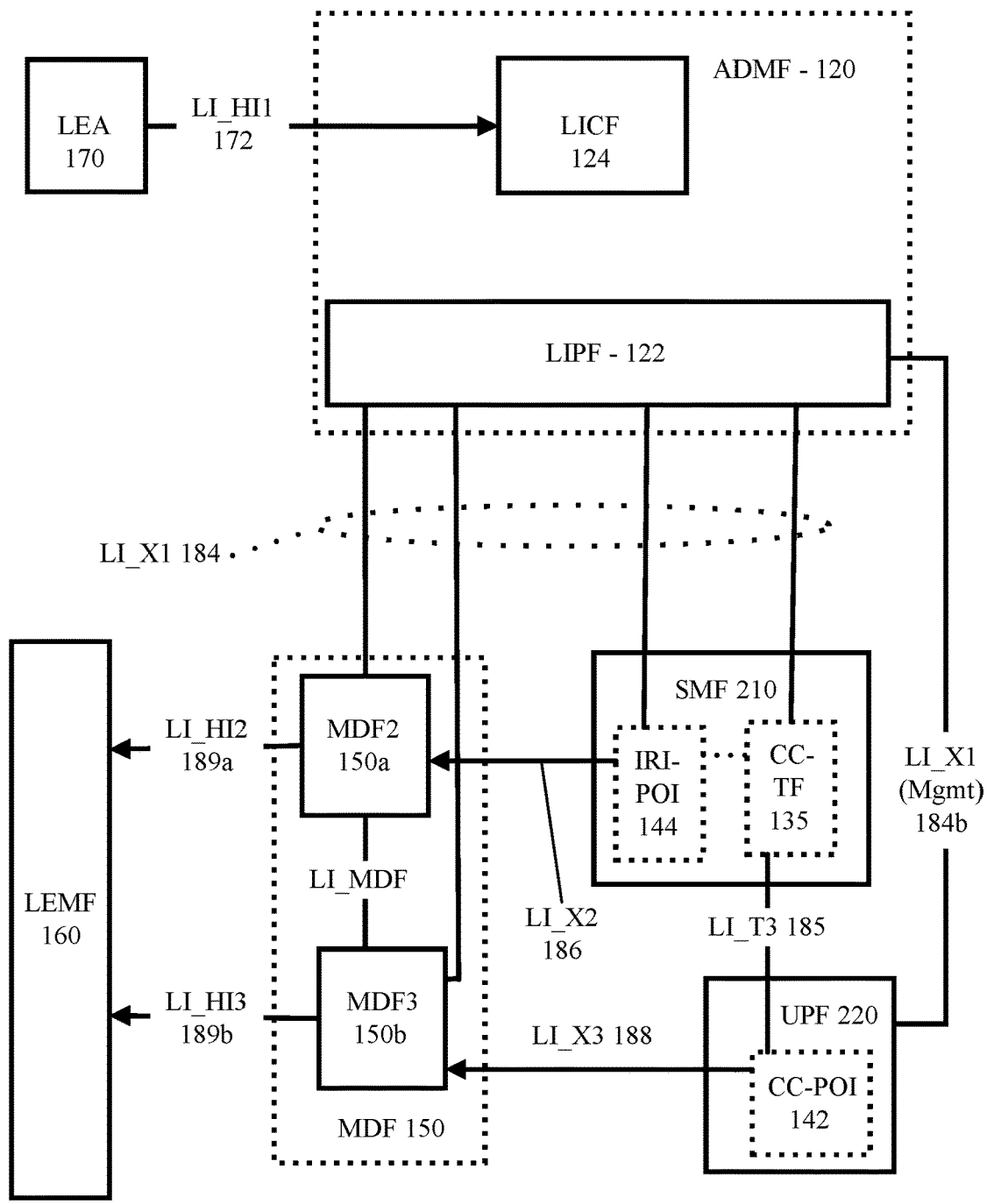
FIG. 2 illustrated aspects of the architecture of FIG. 1 mapped to certain network functions of a 5G core network in an LI architecture for 5G.

Referring to FIG. 2, portions of the architecture 100 of FIG. 1 are mapped to certain network functions of a 5G core network in an LI architecture 200 for 5G. In this architecture 200, the 5G session management SMF 210 that handles control plane actions (e.g. establishing, modifying, deleting) for the PDU sessions includes i) an IRI-POI 144 that has the LI capability to generate the related xIRI (a type of POI output 186), ii) a CC-TF 135, and iv) an IRI-TF (not shown). The 5G user plane function UPF 220 that handles the user plane data includes a CC-POI 142 that has the capability to duplicate the user plane packets from the PDU sessions based on the interception rules received from the CC-TF 135 in the SMF 210. The 5G user plane function UPF 220 that handles the user plane data includes a IRI-POI 144 that has the capability to generate the Summary Reports (IRI-Events) for the packets from the PDU sessions based on the interception rules received from the IRI-TF (not shown) in the SMF 210.

The LICF 124 receives the warrant 102 from an LEA 170 over LI_HI1 172, derives the intercept information from the warrant 102, and provides the derived information to the LIPF 122. The LIPF 122 provisions IRI-POI 144 (present in the SMF 210), MDF2 150a, and MDF3 150b over the LI_X1 interfaces 184. To enable the interception of the target's user plane packets (e.g. when the warrant 102 requires the interception of communication contents), the CC-POI 142 present in the UPF 220 is also provisioned with the intercept data—but is provisioned by the CC-TF-135 in the SMF 210 acting in an ADMF role. To enable the interception summary report of the target's user plane packets (e.g. when the warrant 102 requires interception related information), the IRI-POI 144 present in the UPF 220 is also provisioned with the intercept data—but is provisioned by the IRI-TF (not shown) in the SMF 210 acting in an ADMF role.

The LIPF 122 may interact with the SIRF 110 (over LI_SI 182) to discover the SMFs and UPFs in the network. The IRI-POI 144 present in the SMF 210 detects the PDU session establishment, modification, and deletion related events, generates and delivers the related xIRI to the MDF2 150a over LI_X2. The MDF2 150a delivers the IRI messages to the LEMF 160 over LI_HI2 189a.

When interception of communication contents is required, the CC-TF-135 present in the SMF 210 sends a trigger to the CC-POI 142 present in the UPF 220 over the LI_T3 185 interface. The CC-POI 142 in the UPF 220 presents itself as the same CC-POI 142 to all CC-TFs (e.g., CC-TF-135) in the same SMF set, such that a CC-TF (e.g., CC-TF-135) is capable of modifying or deactivating a task activated/modified in the CC-POI 142 by a different CC-TF in the same SMF set.

The trigger sent from the CC-TF-135 to CC-POI 142 includes the following information: user plane packet detection rules; target identity; correlation information; and MDF3 address. When LI_T3 185 is used, the LI_X1 184b between LIPF 122 and CC-POI 142 present in the UPF 220 is used to monitor the user plane data. The CC-POI 142 present in the UPF 220 generates the xCC (a type of POI output) from the user plane packets and delivers the xCC (that includes the correlation number and the target identity) to the MDF3 150b. The MDF3 150b delivers the CC to the LEMF over LI_HI3 189b.

When LI functions are split across SMF and UPF NEs, as in FIG. 2, LIPF 122 uses the LI_X1 management interface 184b to audit the interception provisioning at the UPF 220. SMF 210 (as CC-TF-135) provisions the tasks on CC-POI 142 of the UPF 220 whenever a PDU session is established, and when some other conditions occur. PDU session establishment depends on the user activity and can happen at any point of time. When LIPF 122 is auditing the CC-POI 142 of the UPF 220, LIPF does not know whether PDU session is established or not for a given target. If SMF 210 fails to provision the target at the CC-POI 142 of the UPF 220, LIPF 122 will not able to detect whether interception is happening or not, and because of this LIPF 122 not able to report missing interception to LEA 170. The same is true regarding the SMF 210 acting as an IRI-TF and failing to provision an IRI-POI.

Some examples of the technology disclosed herein inform LIPF 122 when provisioning (activate/deactivate/modify) failure/rectify happens at a triggered POI 142. Some examples of the technology disclosed herein include provisioning status info in audit messages.

In the first type of examples, a new message from a triggering function (TF) 130 (e.g., CC-TF 135 in an SMF 210 acting as ADMF 120) is used indicate to LIPF 122 when the TF 130 fails to program a task towards a POI (e.g., a CC-POI 142 in a UPF 220). Information to be included in the event include, but is not limited to, Original LIPF provisioned X1 identifier (XID), a list of TF task issue details (which contains NEID of the node where failed to provision the task, the failed XID, message type, type of issue, error code associated with the issue, and further description of the issue if appropriate) when provisioning failure/rectify happens. In some examples, the NE working as ADMF (e.g., CC-TF 135 in an SMF 210 acting as ADMF 120) will continue to include these issues in subsequent audit requests from LIPF 122 until the TF task issues are cleared.

The LIPF 122 generally audits the LI components in each SMF 210 and UPF 220 in regular intervals over LI_X1 interface 184. In the second type of examples, a new field, TFTaskDetails, is added to the existing ETSI GetAllDetails/ GetTaskDetails response. In some examples, TFTaskDetails contains list of successfully provisioned tasks as well as list of TF provisioning failure issue details. The LIPF 122 audits the LI components in the UPF 220 after getting an audit response from the LI components in the SMF 210. The LIPF 122, after receiving audit responses including TFTaskDetails from both a SMF 210 and corresponding UPF 220, validate the details based on ProductID. If tasks are not present on the UPF 220 for a given ProductID, based on details from the SMF 210 response to the audit, then the LIPF 122 can report the problem/alarm to LEA 170 via the LICF 124.

Turning now to FIGS. 3-7, examples are depicted with reference to one or more components and one or more methods that may perform the actions or operations described herein, where components and/or actions/operations in dashed line may be optional. Although the operations described below in flow charts and call flows are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 4:
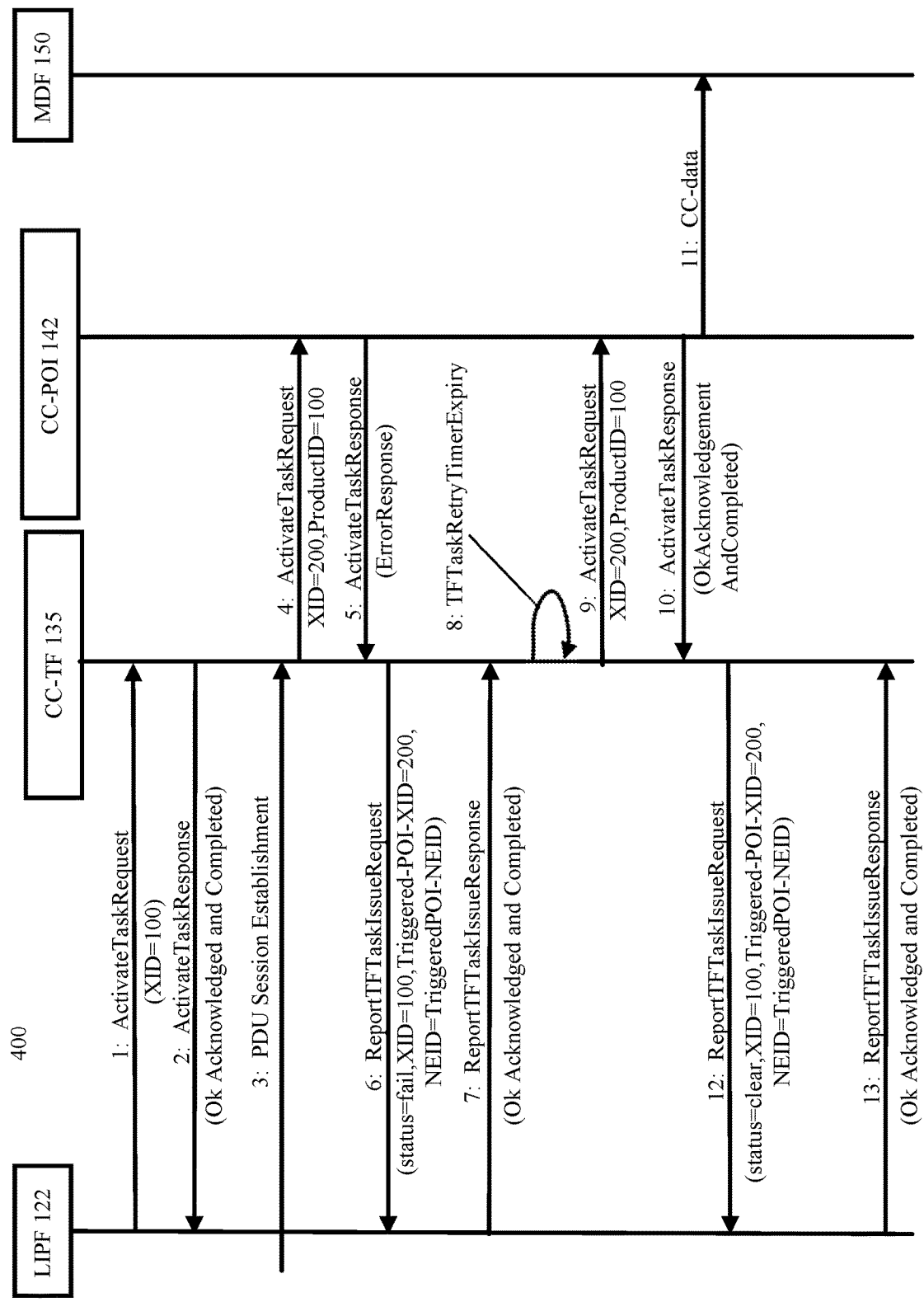
FIG. 4 is an example call flow, in accordance with examples of the technology disclosed herein.

Referring to FIG. 3, and continuing to refer to prior figures for context, a flowchart of methods 300 of wireless communication is shown, in accordance with examples of the technology disclosed herein. In such methods 300, a triggering function (TF) receives a task request from a LI provisioning function (LIFP), the task request comprising a TF task identifier (ID)—Block 310. Referring to FIG. 4, and continuing to refer to prior figures for context, a first example call flow 400 is shown, in accordance with examples of the technology disclosed herein. In such examples, LI is implemented in a 5G network as discussed above in connection with FIG. 2, i.e., the TF is CC-TF 135 located in the SMF 210, and is the network entity (NE)/network function (NF) acting as an ADMF 120. Let "TF-NEID" be the NE identifier for the CC-TF 135. The CC-TF-145 receives an ActivateTaskRequest, an ETSI command for LI, from the LIPF with the XID=100 as an argument in Step 1. The CC-TF 135 responds in Step 2 with an ActivateTaskResponse with "OK—Acknowledged and Completed" as an argument.

Figure 7:
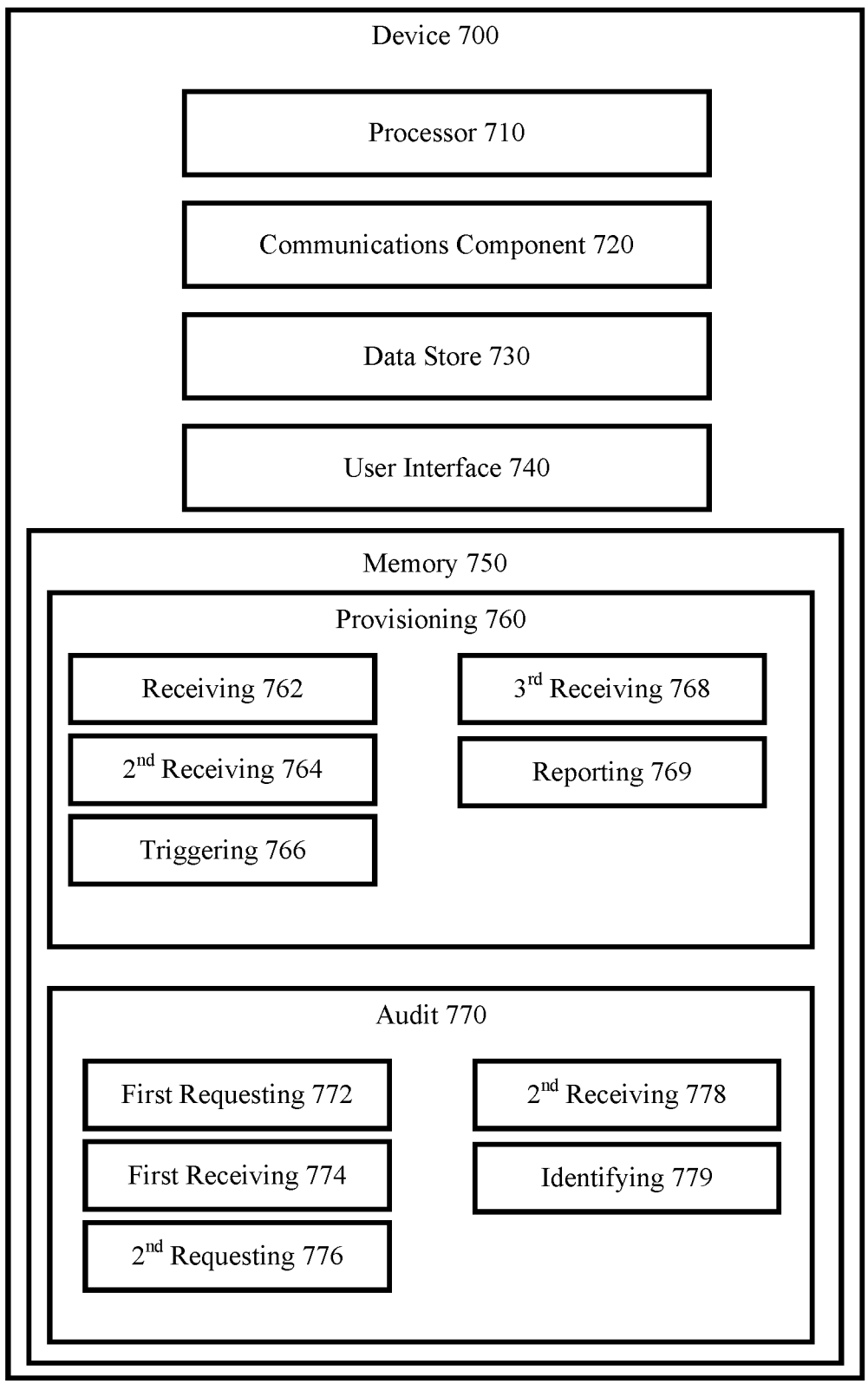
FIG. 7 illustrates an example of a device in accordance with examples of the technology disclosed herein.

Referring to FIG. 7, and continuing to refer to prior figures for context, another representation of a device 700 for lawful intercept implementing a method of FIG. 3 is shown, in accordance with examples of the technology disclosed herein. In some examples, device 700 (described additionally below) includes provisioning component 760. Provisioning component 760 includes receiving component 762. In some examples, receiving component 762 receives a task request from a LI provisioning function (LIFP), the task request comprising a TF task identifier (ID). Accordingly, receiving component 762 may provide means for receiving a task request from a LI provisioning function (LIFP), the task request comprising a TF task identifier (ID).

Referring again to FIG. 3, the TF receives an indication of a protocol data unit (PDU) session establishment applicable to the received task request—Block 320. Referring again to call flow 400, CC-TF 135 executing in SMF 210, receives a notification of the establishment of a PDU session as in Step 3. Referring to FIG. 7, provisioning component 760 includes second receiving component 764. In some examples, second receiving component 764 receives an indication of a PDU session establishment applicable to the received task request. Accordingly, second receiving component 764 may provide means for receiving an indication of a PDU session establishment applicable to the received task request.

Other types of communications and actions can have a similar effect in the context of the technology disclosed herein as receiving a notification of PDU session establishment. For example, mobile edge computing (MEC) provides the capability for a TF/SMF to allocate UPFs/POIs closer to a user equipment (UE) location for a requested task. This presents a scenario similar to receiving notification of a PDU session establishment, in that the TF/SMF is not required to notify the LIPF of ActivateTaskRequest failures in the triggered UPF(s)/POI(s). For a PDU session, the PDU Session Anchor (PSA) UPF is in a local site, i.e. close to the UE location The SMF may change the Triggered POI (PSA) UPF for a Requested Task. The SMF may insert additional UPFs for PDU Session. A PDU session has a PSA UPF in a central site (selected during PDU session establishment)) and one or more UPF in the local site (local UPF). The edge computing application traffic is selectively diverted to the local UPF. The L-PSA UPF may be changed due to e.g. UE mobility.

Referring again to FIG. 3, the TF triggers each POI of one or more POIs applicable to the received task request in response to receiving the indication of PDU session establishment, the triggering including a POI task ID—Block 330. Referring again to call flow 400, in response to the message of Step 3, CC-TF 135 executing in SMF 210 triggers CC-POI 142 with an ActivateTaskRequest (XID=200, Product ID=100) as in Step 4. Note that a new unique XID is generated, and the LIPF-to-CC-TF XID of "100" is used as the Product ID.

Referring to FIG. 7, provisioning component 760 includes triggering component 766. In some examples, triggering component 766 triggers each point of interception (POI) of one or more POIs applicable to the received task request in response to receiving the indication of PDU session establishment, the triggering including a POI task ID. Accordingly, triggering component 766 may provide means for triggering each POI applicable to the received task request in response to receiving the indication of PDU session establishment, the triggering including a POI task ID.

Referring again to FIG. 3, the TF receives, from a triggered POI, a task response indicating a status of the received task at the triggered POI—Block 340. Referring again to call flow 400, CC-TF 135 executing in SMF 210 receives, from CC POI 142 executing in UPF 220, an ActivateTaskResponse with an error response as an argument, as in Step 5.

Referring to FIG. 7, provisioning component 760 includes third receiving component 768. In some examples, third receiving component 768 receives, from a triggered POI, a task response indicating a status of the received task at the triggered POI. Accordingly, third receiving component 768 may provide means for receiving, from a triggered POI, a task response indicating a status of the received task at the triggered POI.

Referring again to FIG. 3, the TF reports, to the LIPF, a TF task issue request indicating i) the status, ii) the TF task ID, iii) the POI task ID, and iv) a network entity ID of the triggered POI—Block 350. Referring again to call flow 400, CC-TF 135 executing in SMF 210 sends a ReportTF-TaskIssueRequest with the arguments (status=fail, XID=100, Triggered-POI-XID=200, NEID=TriggeredPOI-NEID), among other information, to the LIPF 122, as in Step 6. This message provides the LIPF 122 with information that is was lacking about the status of the task triggered under Step 4 under existing approaches.

Referring to FIG. 7, provisioning component 760 includes reporting component 769.

In some examples, reporting component 769 reports, to the LIPF, a TF task issue request indicating i) the status, ii) the TF task ID, iii) the POI task ID, and iv) a network entity ID of the triggered POI. Accordingly, reporting component 769 may provide means for reporting, to the LIPF, a TF task issue request indicating i) the status, ii) the TF task ID, iii) the POI task ID, and iv) a network entity ID of the triggered POI.

The first example continues with the LIPF 122 sending a ReportTFTaskIssueResponse of "OK Acknowledged and Complete," as in Step 7. When provisioning fails the TF will back off for some time (e.g. few secs, as indicated at "Step 8: TFTaskRetryTimerExpiry") and try to provision the Triggered POI with same TF Task details, as in Step 9, on reattempt. This reattempt will happen for the life time PDU session or till it succeed, and is independent of Step 6 and Step 7.

This time, the CC-POI 142 executing on the UPF 220 successfully completes the assigned task and responds with an ActivateTaskResponse (OK Acknowledged and Complete), as in Step 10—along with beginning to send IRI-Event data and CC-data to the MDF 150, as in Step 11. The CC-TF-135 can then report on the successful implementation of task XID=100 to the LIPF 122 by sending another ReportTFTaskIssueRequest to the LIPF 122—but this time with "status=clear," as in Step 12. The CC-TF 135 then receives a ReportTFTaskIssueResponse in Step 13 acknowledging the Step 12 report.

Referring to FIG. 5, and continuing to refer to prior figures for context, a flowchart of methods 500 of wireless communication is shown, in accordance with examples of the technology disclosed herein. In such methods 500, LIPF requests, from a triggering function (TF), details of one or more LIPF tasks previously requested of the TF by the LIPF—Block 510.

Figure 6:
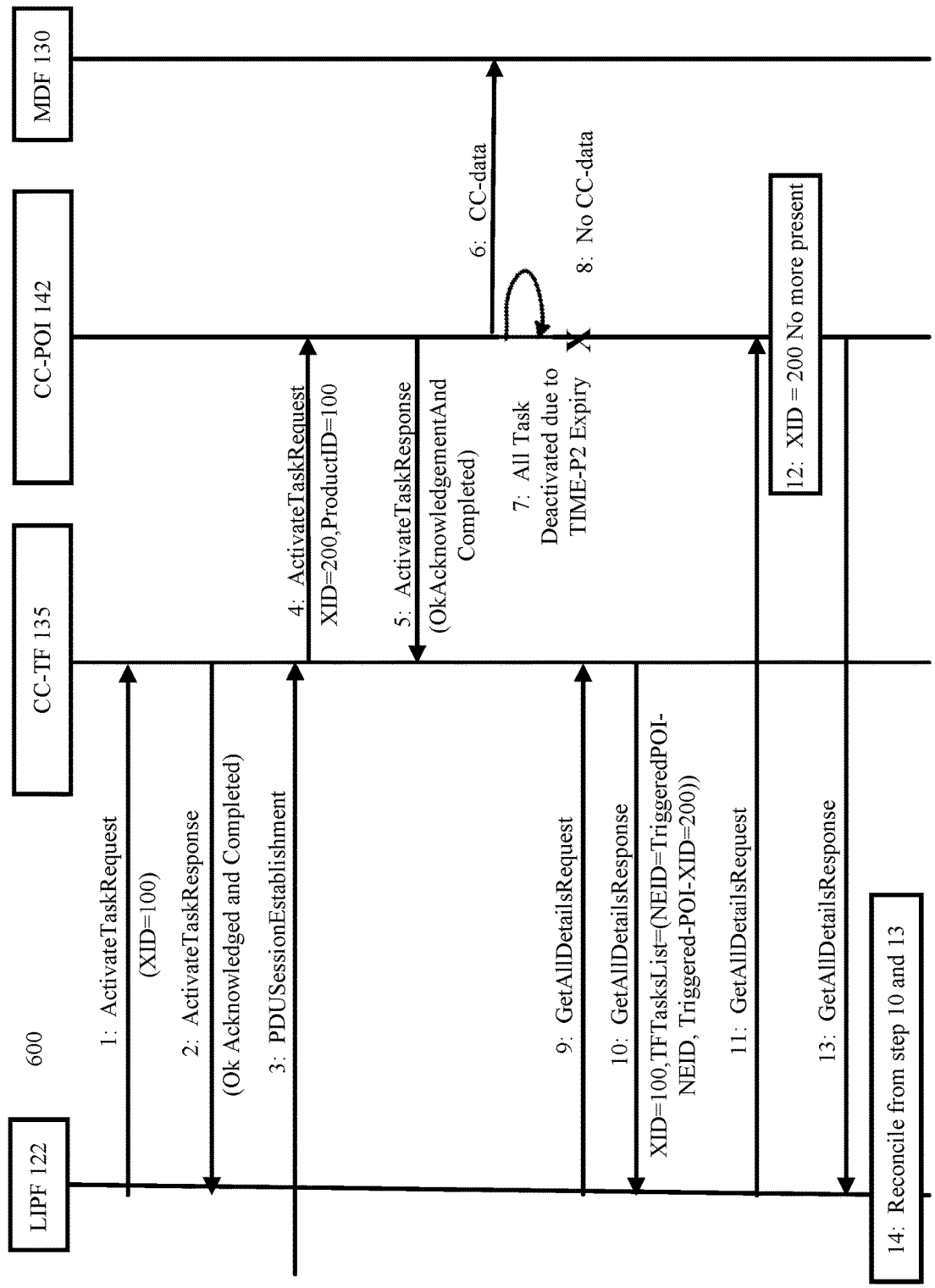
FIG. 6 is an example call flow, in accordance with examples of the technology disclosed herein.

Referring to FIG. 6, and continuing to refer to prior figures for context, a second example call flow 600 is shown, in accordance with examples of the technology disclosed herein. In such examples, LI is implemented in a 5G network as discussed above in connection with FIG. 2, i.e., the TF is CC-TF 135 located in the SMF 210, and is the network entity (NE)/network function (NF) acting as an ADMF 120. Let "TF-NEID" be the NE identifier for the CC-TF 135. The CC-TF-145 receives an ActivateTaskRequest, an ETSI command for LI, from the LIPF with the XID=100 as an argument in Step 1. The CC-TF 135 responds in Step 2 with an ActivateTaskResponse with "OK—Acknowledged and Completed" as an argument. CC-TF 135 executing in SMF 210, receives a notification of the establishment of a PDU session as in Step 3. In response to the message of Step 3, CC-TF 135 executing in SMF 210 triggers CC-POI 142 with an ActivateTaskRequest (XID=200, Product ID=100), as in Step 4. Note that a new unique XID is applied, and the LIPF-to-CC-TF XID of "100" is used as the Product ID.

Different from the example call flow 400 of FIG. 4, in the example call flow 600 the CC-POI 142 executing on the UPF 220 responds to the ActivateTaskRequest of Step 4 with an ActivateTaskResponse with "OK—Acknowledged and Completed" as an argument in Step 5. But some time later, e.g., after forwarding some CC data to the MDF (as in Step 6), all tasks on the CC-POI 142 time out (possibly prematurely), as in Step 7. This event is reported to neither the CC-TF 135 nor the LIPF 122. Note that after TIME_P2 timer expiry CC-POI deactivates the tasks locally. No further IRI or CC data is sent from the CC-POI 142 to the MDF 150, as shown in Step 8.

An existing LIPF 122 has some limited capability to audit the LI NFs (e.g., IRI-POI 144 and CC-TF 135 executing on the SMF 210, and CC-POI 142 executing on the UPF 220) through use of messages such as GetTaskDetails (which takes an XID as an argument), GetAllDetails (which returns NE status, destination details for all destinations present on the NE, and task details for all tasks present on an NE), and ListAllDetails (which returns a list of XIDs on an NE). Examples of the present technology improve on the responses to each such message by adding, for each LIPF-to-TF XID a list of one or more TF-to-POI tasks—a TFTasksList. The TFTasksList list includes the NEID of each POI triggered by TF in response to the task of the XID, and the XID of the TF task sent to the POI. By first auditing the TF in this manner, and then auditing the NEID-identified POI, the LIPF can determine the status (at the POI) of the TF task sent to the POI. While the example call flow 600 of FIG. 6 is presented using the TFTaskList as an information element in the GetAllDetailsResponse, the TFTaskList information element can be added to other audit messages.

As shown in FIG. 6, the LIPF first requests, from a triggering function (TF), details of each LIPF task present in the TF—Block 510. In example call flow 600 at Step 9, the LIPF 122 sends a GetAllDetailsRequest to the CC-TF 135. Note that GetAllDetailsRequest is a NF level message. From an LIPF, GetAllDetailsRequest will be a single message to both CC-TFs and IRI-TFs.

Referring to FIG. 7 again, in some examples, device 700 (described additionally below) includes audit component 770. Audit component 770 includes first requesting component 772. In some examples, first requesting component 772 first requests, from a triggering function (TF), details of each first LIPF task present in the TF. Accordingly, first requesting component 772 may provide means for first requesting, from a triggering function (TF), details of each LIPF task present in the TF.

Returning to FIG. 5, the LIPF first receives, from the TF, a response to the first request—Block 520. The response to the first request identifies, for each LIPF task present in the TF, TF task details of each corresponding TF task triggering a point of interception (POI). The TF task details include an identifier of each triggered POI and a corresponding TF task identifier. In example call flow 600 at Step 10, the CC-TF 135 responds to the GetAllDetailsRequest with a GetAllDetailsResponse containing a TFTasksList for XID=100. The TFTasksList includes the NEID of the triggered CC-POI 142 and the XID=200 used by the CC-TF 135 to trigger CC-POI 142. Note that GetAllDetailsRequest is NF/NE level message, and asks for the all task details present in the NF. The response also a NF/NE level message. As part of GetAllDetailsResponse it will have XID=100 details also.

Referring to FIG. 7 again, in some examples, audit component 770 includes first receiving component 774. In some examples, first receiving component 774 first receives, from the TF, a response to the first request. Accordingly, first receiving component 774 may provide means for first receiving, from the TF, a response to the first request.

Returning to FIG. 5, the LIPF requests, from each identified POI, details of the task corresponding to the TF task identifier—Block 530. Referring to call flow 600, LIPF 122 uses the ETSI message GetAllDetailsRequest to query the CC-TF 135 running in the SMF 210, as in Step 11. Referring to FIG. 7 again, audit component 770 includes second requesting component 776. In some examples, second requesting component 776 requests, from the POI, details of the task corresponding to the TF task identifier. Accordingly, second requesting component 776 may provide means for requesting, from the POI, details of the task corresponding to the TF task identifier.

Returning to FIG. 5, the LIPF receives, from the requested POI, a status of the TF task corresponding to the TF task identifier—Block 540. The response (Step 13) includes ETSI TaskResponseDetails structures for all Tasks present on the POI, as in Step 14 of call flow 600, since the CC-POI 142 determined (as in Step 12) that XID=200 was no longer present on CC-POI 142. If there are no tasks present on the, an empty list is returned. Referring to FIG. 7 again, audit component 770 includes second receiving component 778. In some examples, second receiving component 778 receives, from the requested POI, a status of the TF task corresponding to the TF task identifier. Accordingly, second receiving component 778 may provide means for receiving, from the requested POI, a status of the TF task corresponding to the TF task identifier.

Returning to FIG. 5, optionally the LIPF identifies as in error, each LIPF task for which the TF task details of the response to the first request do not match the TF task details of the response to the second request—Block 550. Call flow 600 shows the LIPF 122, in Step 14, reconciling the GetAllDetailsResponse from Step 10, containing the data element XID=100, TFTasksList=(NEID=TriggeredPOI-NEID, Triggered-POI-XID=200)), with the GetAllDetailsResponse from Step 13 indicating that XID-200 is no longer present on CC-POI 142.

Referring to FIG. 7 again, audit component 770 includes optional identifying component 779. In some examples, optional identifying component 779 identifies as in error, each LIPF task for which the TF task details of the response to the first request do not match the TF task details of the response to the second request. Accordingly, optional identifying component 779 may provide means for identifying as in error, each LIPF task for which the TF task details of the response to the first request do not match the TF task details of the response to the second request.

Generally, FIG. 7 illustrates an example of a device 700 including optional component details. In one aspect, device 700 includes processor 710 for carrying out processing functions associated with one or more of components and functions described herein. Processor 710 can include a single or multiple set of processors or multi-core processors. Moreover, processor 710 can be implemented as an integrated processing system and/or a distributed processing system.

Device 700 further includes memory 750, e.g., for storing local versions of operating systems (or components thereof) and/or applications being executed by processor 710, such as provisioning 760 and Audit 770. Memory 750 can include a type of memory usable by a computer, such as random access memory (RAM), read only memory (ROM), tapes, magnetic discs, optical discs, volatile memory, non-volatile memory, and any combination thereof.

Further, device 700 may include a communications component 720 that provides for establishing and maintaining communications with one or more other devices, parties, entities, etc. utilizing hardware, software, and services as described herein. Communications component 720 may carry communications between components on device 700, as well as between device 700 and external devices, such as devices located across a communications network and/or devices serially or locally connected to device 700. For example, communications component 720 may include one or more buses, and may further include transmit chain components and receive chain components associated with a wireless or wired transmitter and receiver, respectively, operable for interfacing with external devices.

Additionally, device 700 may include a data store 730, which can be any suitable combination of hardware and/or software, that provides for mass storage of information, databases, and programs employed in connection with aspects described herein. For example, data store 730 may be or may include a data repository for operating systems (or components thereof), applications, related parameters, etc. not currently being executed by processor 710. In addition, data store 730 may be a data repository for the provisioning component 760 and the audit component 770.

Device 700 may optionally include a user interface component 740 operable to receive inputs from a user of device 700 (e.g., datacenter maintenance personnel) and further operable to generate outputs for presentation to the user. User interface component 740 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 740 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A triggering function (TF) device for lawful interception (LI) of electronic communications, the device comprising:
    a memory storing instructions; and
    at least one processor communicatively coupled with the memory and configured to:
        receive, by a triggering function (TF), a task request from an LI provisioning function (an LIFP), the task request comprising a TF task identifier (ID);
        receive, by the TF, an indication of a protocol data unit (PDU) session establishment applicable to the received task request;
        trigger, by the TF, each point of interception (POI) of one or more POIs applicable to the received task request in response to receiving the indication of PDU session establishment, the triggering including a POI task ID;
        receive, by the TF from a triggered POI, a task response indicating a status of the received task at the triggered POI; and
        report, by the TF to the LIPF, a TF task issue request indicating i) the status, ii) the TF task ID, iii) the POI task ID, and iv) a network entity ID of the triggered POI.

2. The device of claim 1, wherein the task request is one of activate a task, modify a task, and deactivate a task.

3. The device of claim 1, wherein the TF is instantiated in a session management function (SMF) of a 5G core network, and the POI is instantiated in a user plane function (UPF) of the 5G core network.

4. A method for lawful interception (LI) of electronic communications, comprising:
    receiving, by a triggering function (TF), a task request from a LI provisioning function (LIFP), the task request comprising a TF task identifier (ID);
    receiving, by the TF, an indication of a protocol data unit (PDU) session establishment applicable to the received task request;
    triggering, by the TF, each point of interception (POI) of one or more POIs applicable to the received task request in response to receiving the indication of PDU session establishment, the triggering including a POI task ID,
    receiving, by the TF from a triggered POI, a task response indicating a status of the received task at the triggered POI, and
    reporting, by the TF to the LIPF, a TF task issue request indicating i) the status, ii) the TF task ID, iii) the POI task ID, and iv) a network entity ID of the triggered POI.

5. The method of claim 4, wherein the task request is one of activate a task, modify a task, and deactivate a task.

6. The method of claim 4, wherein the TF is instantiated in a session management function (SMF) of a 5G core network, and the POI is instantiated in a user plane function (UPF) of the 5G core network.

7. A non-transitory computer-readable medium storing instructions thereon that, when executed by at least one computing device, causes the at least one computing device to perform operations comprising:
    receiving, by a triggering function (TF), a task request from a LI provisioning function (LIFP), the task request comprising a TF task identifier (ID);
    receiving, by the TF, an indication of a protocol data unit (PDU) session establishment applicable to the received task request;
    triggering, by the TF, each point of interception (POI) of one or more POIs applicable to the received task request in response to receiving the indication of PDU session establishment, the triggering including a POI task ID;
    receiving, by the TF from a triggered POI, a task response indicating a status of the received task at the triggered POI; and
    reporting, by the TF to the LIPF, a TF task issue request indicating i) the status, ii) the TF task ID, iii) the POI task ID, and iv) a network entity ID of the triggered POI.

8. The computer-readable medium of claim 7, wherein the task request is one of activate a task, modify a task, and deactivate a task.

9. The computer-readable medium of claim 7, wherein the TF is instantiated in a session management function (SMF) of a 5G core network, and the POI is instantiated in a user plane function (UPF) of the 5G core network.

* * * * *